US006826725B1

(12) United States Patent
Beezer et al.

(10) Patent No.: US 6,826,725 B1
(45) Date of Patent: Nov. 30, 2004

(54) TECHNIQUES FOR INVOKING SYSTEM COMMANDS FROM WITHIN A MARK-UP LANGUAGE DOCUMENT

(75) Inventors: John L. Beezer, Seattle, WA (US); David M. Silver, Redmond, WA (US); Zeman Pavel, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 09/465,081

(22) Filed: Dec. 16, 1999

(51) Int. Cl.[7] .............................................. G06F 15/00
(52) U.S. Cl. ..................... 715/513; 715/501.1; 345/760
(58) Field of Search ............................ 715/513, 501.1, 715/516, 524, 526; 345/733, 760, 764; 707/204, 10; 717/115; 709/204, 245

(56) References Cited

U.S. PATENT DOCUMENTS

| | | | |
|---|---|---|---|
| 5,852,439 A | | 12/1998 | Musgrove et al. |
| 5,898,835 A | | 4/1999 | Truong |
| 5,956,483 A | * | 9/1999 | Grate et al. ................. 709/203 |
| 5,982,370 A | | 11/1999 | Kamper |
| 5,982,445 A | * | 11/1999 | Eyer et al. .................. 348/461 |
| 5,991,760 A | * | 11/1999 | Gauvin et al. ................ 707/10 |
| 6,092,204 A | * | 7/2000 | Baker ......................... 713/201 |
| 6,139,177 A | * | 10/2000 | Venkatraman et al. ......... 700/83 |
| 6,192,415 B1 | * | 2/2001 | Haverstock et al. ........ 709/245 |
| 6,195,707 B1 | * | 2/2001 | Minh ......................... 709/245 |
| 6,288,716 B1 | * | 9/2001 | Humpleman et al. ....... 345/733 |
| 6,449,640 B1 | * | 9/2002 | Haverstock et al. ........ 709/219 |
| 6,457,060 B1 | * | 9/2002 | Martin et al. ............... 709/245 |
| 6,625,624 B1 | * | 9/2003 | Chen et al. .................. 707/204 |
| 2002/0059402 A1 | * | 5/2002 | Belanger .................... 709/220 |

FOREIGN PATENT DOCUMENTS

| | | |
|---|---|---|
| CA | 2205096 | 11/1998 |
| EP | 0866591 | 9/1998 |

OTHER PUBLICATIONS

Open eBook™ Publication Structure 1.0, Sep. 16, 1999.
D. Anderson, "FireWire System Architecture", Second Edition, PHY Packet Format, Sep. 20, 1999, Addison Wesley, Reading, Massachusetts, XP002171989, chapters 10 and 13, pp. 213–219 and pp. 265–272.
International Search Report (8 pages).
"Dynamic HTML: The Next Generation of User–Interface Design," Microsoft Corporation, Feb. (1997),, 6 pages.
"Use of HTML Forms in Complex User Interfaces for Server–Side Applications," Int. J. Human–Computer Studies (1997), pp. 761–771.
"Internet Installation of Software Updates Using a Web Browser," IBM Technical Disclosure Bulletin, vol. 39, No. 11, Nov. (1996), pp. 169–170.
"Jump Starting Your Site With Dynamic HTML," Web Techniques, Dec. (1997), pp. 35–41.
"Scriplets: Reusable Objects for Web Authors," Bob Jervis, Sep. 24, 1997, 4 pages.

* cited by examiner

*Primary Examiner*—Joseph Feild
*Assistant Examiner*—Maikhanh Nguyen
(74) *Attorney, Agent, or Firm*—Banner & Witcoff, Ltd.

(57) ABSTRACT

A method and apparatus for invoking system resources directly from within a mark-up language document. Links referencing a pre-defined system command to be invoked may be embedded within the document. The specific system command may be identified in the link by an alias, such as, for example, a numeric code. By clicking on the link, the system will analyze the contents of the link. If the link calls for invoking a system command, the system will extract the alias, determine the appropriate pre-defined system command referred to by the alias, and execute the system command.

14 Claims, 7 Drawing Sheets

| ALIAS | SYSTEM COMMAND |
|---|---|
| -100 | Adjust Brightness |
| -99 | Adjust Contrast |
| -98 | Adjust Page Color Range |
|  |  |
| ... | ... |
|  |  |
| -1 | Hide/Show Visual Guides |
| 0 | Hide/Show Bookmarks |
| 1 | Hide/Show Text Notes |
| 2 | Hide/Show Drawings |
| 3 | Hide/Show Highlights |
| 4 | Large/Small Fonts |
| ... | ... |
|  |  |
| 98 | Open for Third Party Command |
| 99 | Open for Third Party Command. |
| 100 | Open for Third Party Command |

Alice was beginning to get very tired of sitting by her sister on the bank, and of having nothing to do: once or twice she had peeped into the book her sister was reading, but it had no pictures or conversations in it, "and what is the use of a book," thought Alice, "without pictures or conversation?"So she was considering in her own mind (as well as she could, for the hot day made her feel very sleepy and stupid), whether the pleasure of making a daisy-chain would be worth the trouble of getting up and picking the daisies, when suddenly a White Rabbit with pink eyes ran close by her.There was nothing so very remarkable in that; nor did Alice think it so very much out of the way to hear the Rabbit say to itself, "Oh dear! Oh dear! I shall be late!" (when she thought it over afterwards, it occurred to her that she ought to have wondered at this, but at the time it all seemed quite natural); but when the Rabbit actually took a watch out of its waistcoat-pocket, and looked at it, and then hurried on, Alice st

FIGURE 6

TECHNIQUES FOR INVOKING SYSTEM COMMANDS FROM WITHIN A MARK-UP LANGUAGE DOCUMENT

FIELD OF THE INVENTION

The present invention relates to mark-up language documents, and more particularly to techniques for invoking system commands from within a mark-up language document.

BACKGROUND OF THE INVENTION

Mark-up languages have become exceedingly popular tools for authoring electronic content. Mark-up languages used today include, for example, Standard Generalized Markup Language (SGML), HyperText Markup Language (HTML), eXtensible Markup Language (XML), eXtensible HyperText Markup Language (XHTML), and Synchronized Multimedia Integration Language (SMIL). These languages allow the developer to "mark-up" a document. For example, tags may be inserted within the document to specify how the document, or a portion of the document, should be formatted or displayed. As another example, links may be used to define relationships between the document and other documents and to allow a user to jump from one document to another. Links may also be used to perform various functions including, for example, to create tool bars, to link to a cascading style sheet (rev=stylesheet), a script (rev=script), or a printable version (like a .pdf) of the document (rev=print), and to embed authorship details. Links may also perform a variety of functions, including executing a string of commands such as JavaScript commands.

When viewed through an application program, such as a web browser or a reading device (discussed herein), links are commonly depicted as underlined text having a blue or red color. In the mark-up language document itself, the link is designated by a link attribute and corresponding language to indicate the resource to which it refers. The link attributes generally include, for example, the following: href (URL for linked resource); id (SGML ID attribute); rel (forward link types); rev (reverse link types); and title (advisory title string). Examples of links within a mark-up language document include:

1)<A HREF="http://msn.com">
2)<A HREF="ftp://msn.com">
3)<A HREF="javascript://msn.com">
4)<A HREF="mailto:jdoe@webreference.com">

The first link refers to a HyperText Transfer Protocol (HTTP) and provides a Uniform Resource Locator (URL) to which the system should jump. The second link refers to a File Transfer Protocol (FTP) and provides a file the system should retrieve. The third link provides JavaScript that the system should run. The fourth link provides an e-mail address to which the system should send an e-mail message.

Because of their versatility, mark-up languages are now used in a number of applications. One such application is for authoring web-page content. Another such application that is rapidly gaining recognition is for so-called "electronic books" or "e-books." E-books are electronic publications (such as books, journals, magazines, etc.) that can be viewed using computer-based display devices. Application programs running on these reading devices display the e-book content. Examples of such reading devices include the "ROCKET EBOOK" by NuvoMedia, Inc. and the "SOFT-BOOK READER" by Softbook Press, Inc. Alternatively, these devices may be traditional computing devices such as personal computers.

E-books are provided in a mark-up language format. As a result, e-book pages may be formatted and linked using the commands available in the mark-up language. For example, e-books may be formatted in a general format in accordance with an Open eBook standard. This standard is set forth in Open eBook Publication Structure 1.0, which can be found at www.openebook.org and Open eBook Forum, 302 A West 12th Street, #304. New York, N.Y. 10014. This publication is incorporated herein by reference in its entirety.

One aspect of e-books is that it may be desirable to perform various system commands while viewing an e-book. Consider, for example, a user viewing an e-book from a personal computing environment. The user may wish to adjust the font settings. Present systems are limiting in that the user must take several steps to invoke system commands and operations. To adjust font settings, the user must exit the window for the e-book viewing program, call up the specific commands from the operating system to adjust the font, and then return to the e-book. This may be particularly disruptive where the user is in the middle of reading an e-book. It is therefore desirable to have a system where system commands may be more conveniently accessed and performed without interrupting the user's activity.

Certain techniques can be used to perform functions within a mark-up language document. In particular, JavaScript may be directly embedded with a tag within the mark-up language document. The tag may designate the JavaScript such that when a user selects the corresponding link, the JavaScript is executed. However, this technique is limiting in that the JavaScript may only perform limited operations and, more significantly, cannot execute system commands outside of the application program reading the JavaScript. Further, the entire JavaScript command set must be included within the mark-up language document. The negative consequence is that is possibly undesirable and even malicious functions may be unknowingly executed. Further, the JavaScript-based approach is limiting in that it may unnecessarily increase the size of the document, especially in documents having a large number of JavaScript links. Many e-book documents already are rather large due to the significant amount of text and graphic content. It is therefore desirable to have a system where pre-defined system commands may be easily identified and executed without requiring increased memory for the document.

SUMMARY OF THE INVENTION

The present invention solves many of the aforementioned problems by providing a method of invoking pre-defined system commands directly from a mark-up language document. Links referencing a pre-defined system command to be invoked may be embedded within the document. The specific system command may be identified in the link by an alias, such as, for example, a numeric code. When a user selects the link, the system will analyze the contents of the link. If the link includes an instruction to invoke a system command, the system will extract the corresponding alias, refer to a look-up table to identify the appropriate system command to which the alias refers, and execute the identified system command. The look-up table correlates each alias with a pre-defined system command.

By using the invoking techniques of the present invention, system commands may be invoked directly from within a mark-up language document. Further, since only those system commands identified in the look-up table can be performed, undesirable or harmful system commands are precluded from being invoked. Even further, desired functionality may be provided in mark-up language documents without the need to enter script in the document itself. Even further, system commands may be subsequently added, altered, disabled, or removed from the look-up table and the change can thereby be applied to all pre-existing documents. These as well as other novel advantages, details, embodiments, features and objects of the present invention will be apparent to those skilled in the art from following the detailed description of the invention, the attached claims and accompanying drawings, listed herein, which are useful in explaining the invention.

BRIEF DESCRIPTION OF THE DRAWINGS

In the following text and drawings, wherein similar reference numerals denote similar elements throughout the several views thereof, the present invention is explained with reference to illustrative embodiments, in which:

FIG. 3 is an illustrative table identifying various aliases and the corresponding pre-defined system commands in accordance with the present invention;

FIG. 6 is a screen print of a page of an e-book having large fonts; and

DETAILED DESCRIPTION OF THE INVENTION

In a preferred embodiment, the present invention is implemented within electronic books ("e-books") and/or programs and devices for reading e-books. However, the invention may be implemented within, and therefore encompasses, any mark-up language document and any system that interacts with mark-up language documents.

Figure 1:
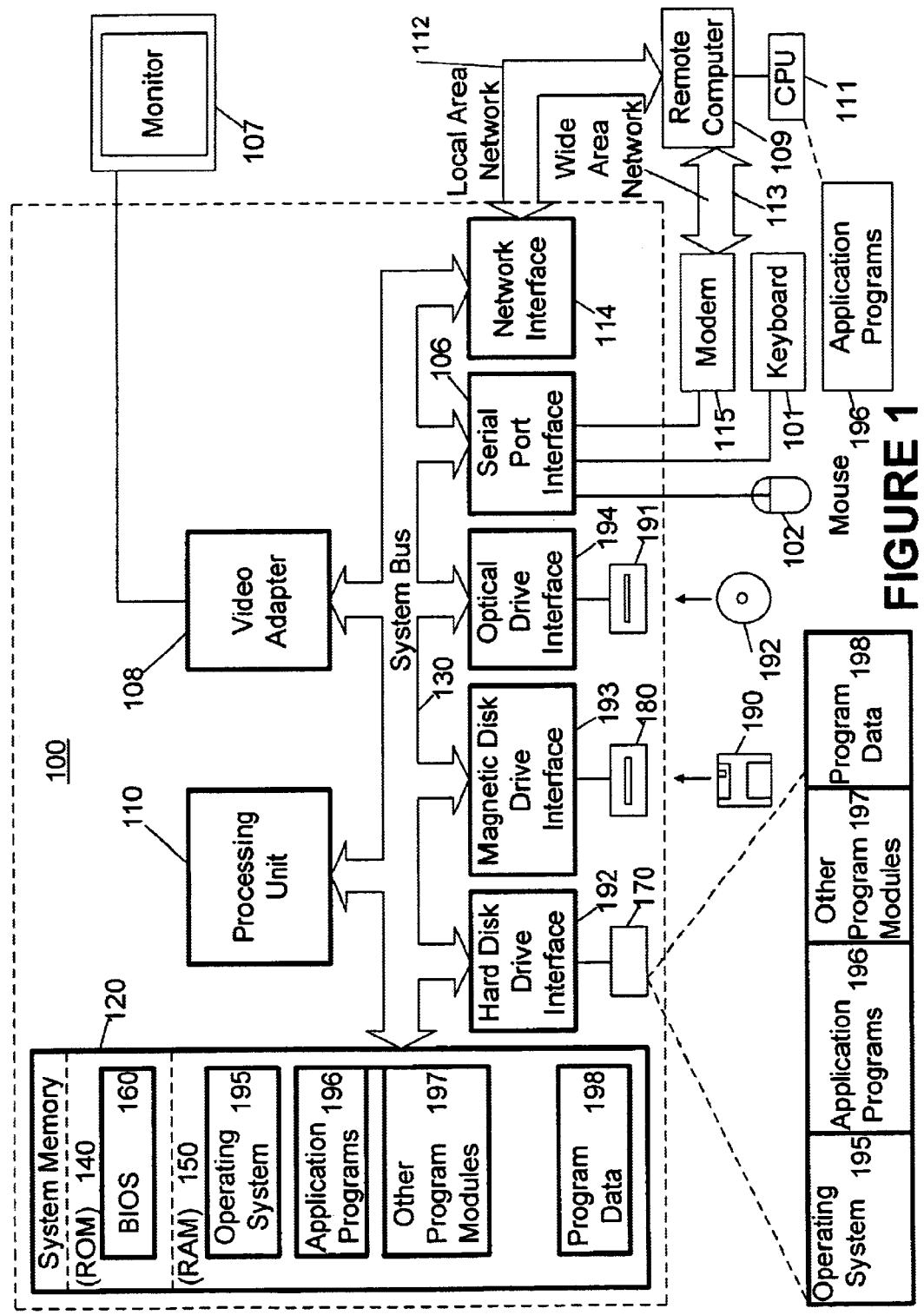
FIG. 1 is a schematic block diagram of a computing device for use with the present invention.

The electronic reading device for use with the present invention may be a separate hand-held computing device or may be an application for use with a more general computing device such as a personal computer (FIG. 1). Hand-held reading devices available today include, for example, Windows CE devices.

FIG. 1 is a schematic block diagram depicting a personal computing device for use with the present invention. It is envisioned that the hand-held reading device would be a simplified version of personal computer 100. The personal computing device is typically a general-purpose-computing device in the form of a conventional personal computer 100, including a processing unit 110, a system memory 120, and a system bus 130 that couples various system components including the system memory to the processing unit 10. The system bus 130 may be any of several types of bus structures including a memory bus or memory controller, a peripheral bus, and a local bus using any of a variety of bus architectures. The system memory includes read only memory (ROM) 140 and random access memory (RAM) 150.

A basic input/output system 160 (BIOS), containing the basic routines that help to transfer information between elements within the personal computer 100, such as during start-up, is stored in ROM 140. The personal computer 100 further includes a hard disk drive 170 for reading from and writing to a hard disk, not shown, a magnetic disk drive 180 for reading from or writing to a removable magnetic disk 190, and an optical disk drive 191 for reading from or writing to a removable optical disk 192 such as a CD ROM or other optical media. The hard disk drive 170, magnetic disk drive 180, and optical disk drive 191 are connected to the system bus 130 by a hard disk drive interface 192, a magnetic disk drive interface 193, and an optical disk drive interface 194, respectively. The drives and their associated computer-readable media provide nonvolatile storage of computer readable instructions, data structures, program modules and other data for the personal computer 100.

Although the exemplary environment described herein employs a hard disk, a removable magnetic disk 190 and a removable optical disk 192, it should be appreciated by those skilled in the art that other types of computer readable media which can store data that is accessible by a computer, such as magnetic cassettes, flash memory cards, digital video disks, Bernoulli cartridges, random access memories (RAMs), read only memories (ROMs), and the like, may also be used in the exemplary operating environment. It is anticipated that a hand-held device implementing this invention would typically have only one mass-storage peripheral, either a micro hard disk or else flash memory or equivalent.

A number of program modules may be stored on the hard disk, magnetic disk 190, optical disk 192, ROM 140 or RAM 150, including an operating system 195, one or more application programs 196, other program modules 197, and program data 198. A user may enter commands and information into the personal computer 100 through input devices such as a keyboard 101 and pointing device 102. Other input devices (not shown) may include a microphone, joystick, game pad, satellite dish, scanner, or the like. These and other input devices are often connected to the processing unit 110 through a serial port interface 106 that is coupled to the system bus, but may be connected by other interfaces, such as a parallel port, game port or a universal serial bus (USB). A monitor 107 or other type of display device is also connected to the system bus 130 via an interface, such as a video adapter 108. In addition to the monitor, personal computers typically include other peripheral output devices (not shown), such as speakers and printers. Preferably, any implementation of the present invention is designed to be operable in a least case scenario only by touch, and does not always require the use of a keyboard or mouse.

The personal computer 100 may operate in a networked environment using logical connections to one or more remote computers, such as a remote computer 109. The remote computer 109 may be another personal computer, a server, a router, a network PC, a peer device or other common network node, and typically includes many or all of the elements described above relative to the personal computer 100, although only a memory storage device 111 has been illustrated in FIG. 1. The logical connections depicted in FIG. 1 include a local area network (LAN) 112 and a wide area network (WAN) 113. Such networking environments are commonplace in offices, enterprise-wide computer networks, intranets and the Internet. It is anticipated that a hand-held device used to implement the present invention would typically use a wireless LAN interface based on an infra-red or radio frequency communication link.

When used in a LAN networking environment, the personal computer 100 is connected to the local network 112 through a network interface or adapter 114. When used in a WAN networking environment, the personal computer 100 typically includes a modem 115 or other means for establishing a communications over the wide area network 113, such as the Internet. The modem 115, which may be internal or external, is connected to the system bus 130 via the serial port interface 106. In a networked environment, program modules depicted relative to the personal computer 100, or portions thereof, may be stored in the remote memory storage device. It will be appreciated that the network connections shown are exemplary and other means of establishing a communications link between the computers may be used.

Figure 2:
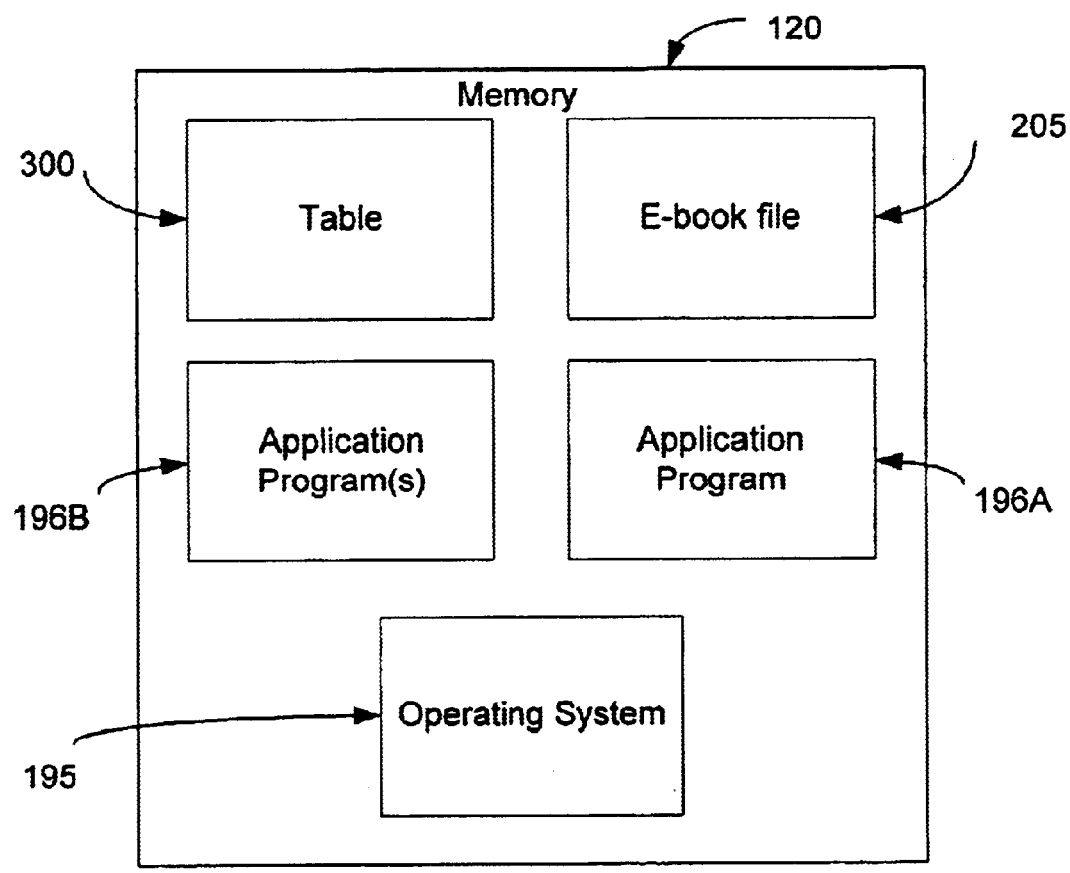
FIG. 2 is a schematic block diagram of a reading device in accordance with a preferred embodiment of the present invention.

FIG. 2 is a simplified schematic block diagram of various elements of a reading device in accordance with a preferred embodiment of the present invention. Resident within memory 120 are a look-up table 300, an application program 196A for reading e-books, one or more e-book files 205, and one or more other application programs 196B (optional). Memory 120 also includes, among other things, an operating system 195. It will be readily apparent that the e-book file may also be resident within other memory devices of the computing system of FIG. 1 such as hard disk drive 170, magnetic disk 190, optical disk 192, or remote computer 109. Further, those skilled in the art will appreciate that the present invention may be incorporated in any number of system architectures other than that of FIG. 1. In the embodiment of FIG. 2, the application program 196A for reading e-books runs on the operating system platform 195, displays one or more e-books 205, and uses table 300 to identify and invoke pre-defined system commands. Table 300 and the techniques for invoking system commands in accordance with the present invention are discussed herein.

In accordance with a preferred embodiment of the present invention, a link within a mark-up language document invokes a system command to be performed. System commands are generally functions or operations that may be performed by an operating system or other applications related to the mark-up language document. As preferred, the link is accompanied by an instruction to invoke and an alias to identify a specific system command to be invoked. The alias is a reference code identifying a pre-defined system command. In this regard, the following link may be used:

<A HREF=X-MSR1INVOKE: –100>Link Text Goes Here</a>

The instruction to invoke the system command is the term "X-MSR1INVOKE" and the alias is the term "–100" in the above link. Those skilled in the art will appreciate that any number of such instructions and aliases may be used and still be considered within the scope of the present invention. The alias refers to a pre-defined system command, which may be ascertained from a look-up table identifying the system commands for each alias. The table 300 of FIG. 3 is illustrative in this regard. In the embodiment illustrated in FIG. 3, table 300 provides a first column 310 of various aliases ranging from –100 to +100. A second column 320 identifies the pre-defined system commands corresponding to the alias. For example, the alias –99 identifies the system command for adjusting the contrast a specified amount. Aliases 98–100 remain undefined. The table 300 may be subsequently amended to add new system commands or to alter, disable, and/or remove existing commands.

In addition to aliases having certain pre-defined system commands, certain aliases may also be reserved for future development, including for example, applets for third-party applications. These system commands may be performed, for example, by other application programs 196B.

Any number of system commands may be performed by the invoking function of the present invention including, but not limited to, system configuration commands, networked operations, commerce functions, and utilities commands. System configuration commands may include, for example, Brightness (+,–), Contrast (+,–), Page Color (range: 0 to 512), Rotate (90,180,270), Visual Guides is (hide/show), All Annotations (hide/show), Bookmarks (hide/show), Highlights (hide/show), Notes (hide/show), Drawings (hide/show), and Riffle Increments (range). Networked operations may include, for example, Network Lookup (lookup a definition of a term in a networked reference source), and Network Search (lookup references to a term in a networked index). Commerce functions may include, for example, Initiate Transaction, Initiate File Upload, and Form Post (send information to a server). Utilities commands may include, for example, Load Value (entering a value into the system to be operated on by next X-MSR1INVOKE command).

Advantageously, the table 300 pre-defines the various system commands that may be automatically invoked when the user selects the corresponding link. Further, since only those system commands that are provided in table 300 may be invoked, undesirable or even harmful system commands are thereby precluded from be invoked. Even further, table 300 may be subsequently modified and such changes to the table 300 may be applied to all links referencing alias defined by the table 300. For example, a system command to increase the font by one increment may be altered to increase the font by three increments. Accordingly, the link referencing the system command to adjust the font will then adjust the font by three increments rather than one.

Figure 4:
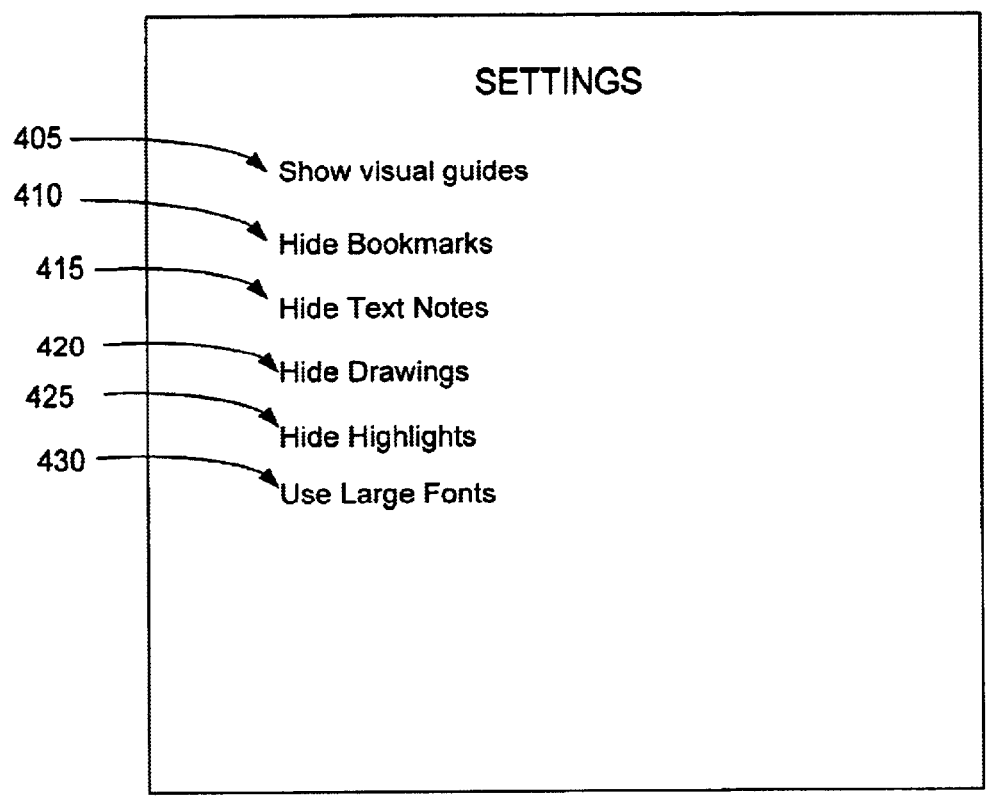
FIG. 4 is an illustration of the present invention implemented within a reading device for reading e-books.

FIG. 4 illustrates an example of how the present invention may be implemented within a system for reading mark-up language documents. FIG. 4 depicts a screen of an application program 400 showing a page from an e-book. The page is essentially a listing of links 405–430 that allow the user to invoke various system commands. The user may click on one of the links 405–430 using a pointing device, such as a mouse 102, thereby automatically executing the selected system command. In this example, links 405–430 have embedded aliases –1 through 4, respectively, in the mark-up language document. The corresponding pre-defined system commands for these aliases are identified by table 300 of FIG. 3. For example, the "Use Large Fonts" link 430 has an alias of 4 and may be written in the mark-up language document as follows:

<A HREF=X-MSR1INVOKE: 4>Use Large Fonts</a>

By selecting the "Use Large Fonts" link 430, the system command for adjusting font size is automatically invoked and a large font format is thereby applied. The large font setting is preferably applied to all e-books viewed by the reading program 400 until the "Use Small Fonts" link 430 is selected. Alternatively, the system command may apply to only that particular e-book that is being viewed, such that default settings are applied when other e-books are viewed.

Figure 5:
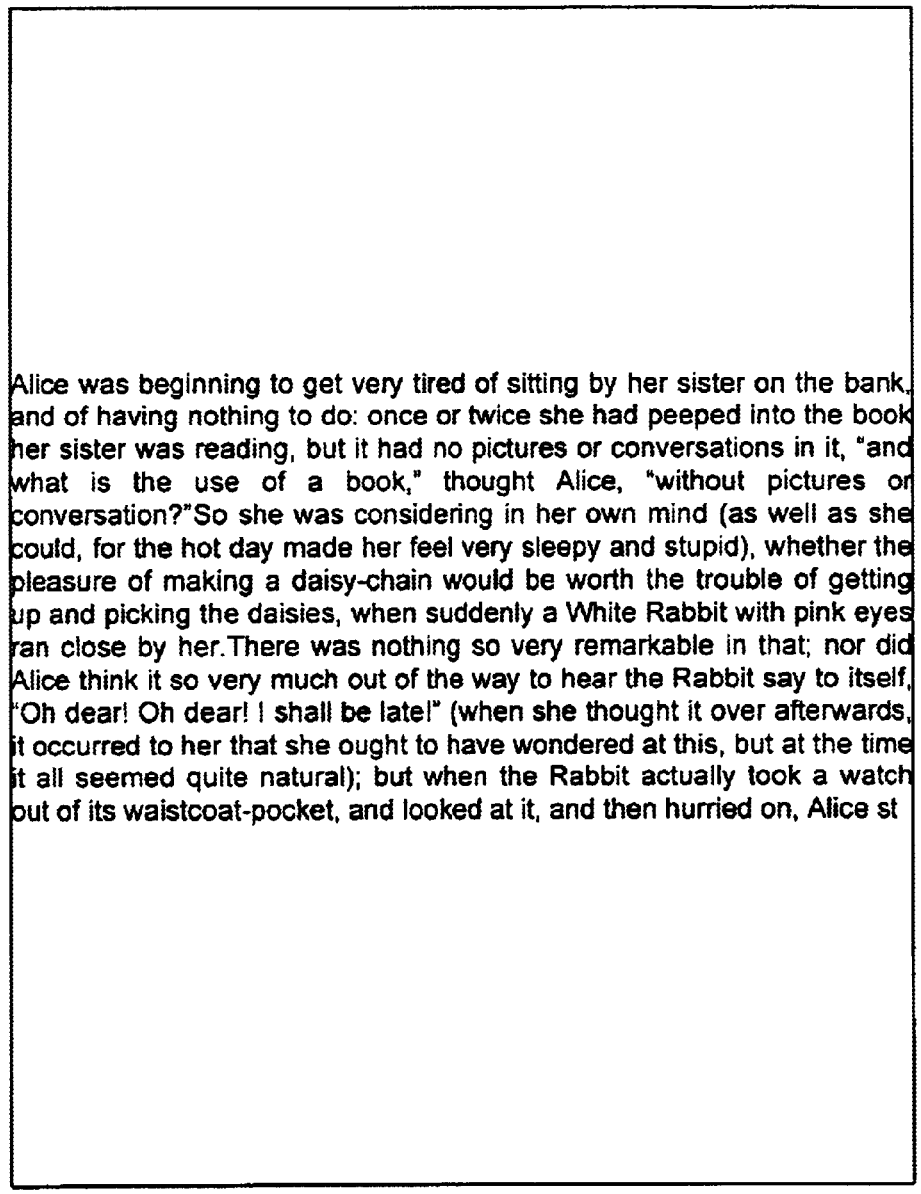
FIG. 5 is a screen print of a page of an e-book having small fonts.

Referring still to FIG. 4, after the system command has been invoked, link 430 is automatically renamed to "Use Small Fonts". The system senses that some of the system commands are complements of each other and renames the text visible on the screen to reflect the changed settings. FIGS. 5 and 6 respectively illustrate the font size of a page of an e-book before and after the link 430 was selected.

In an alternative embodiment, more than one function may be invoked by a link. For example, the following link may be used to invoke two system commands:

<A HREF=X-MSR1INVOKE: −100, −99>Link Text Goes Here</a>

Figure 7:
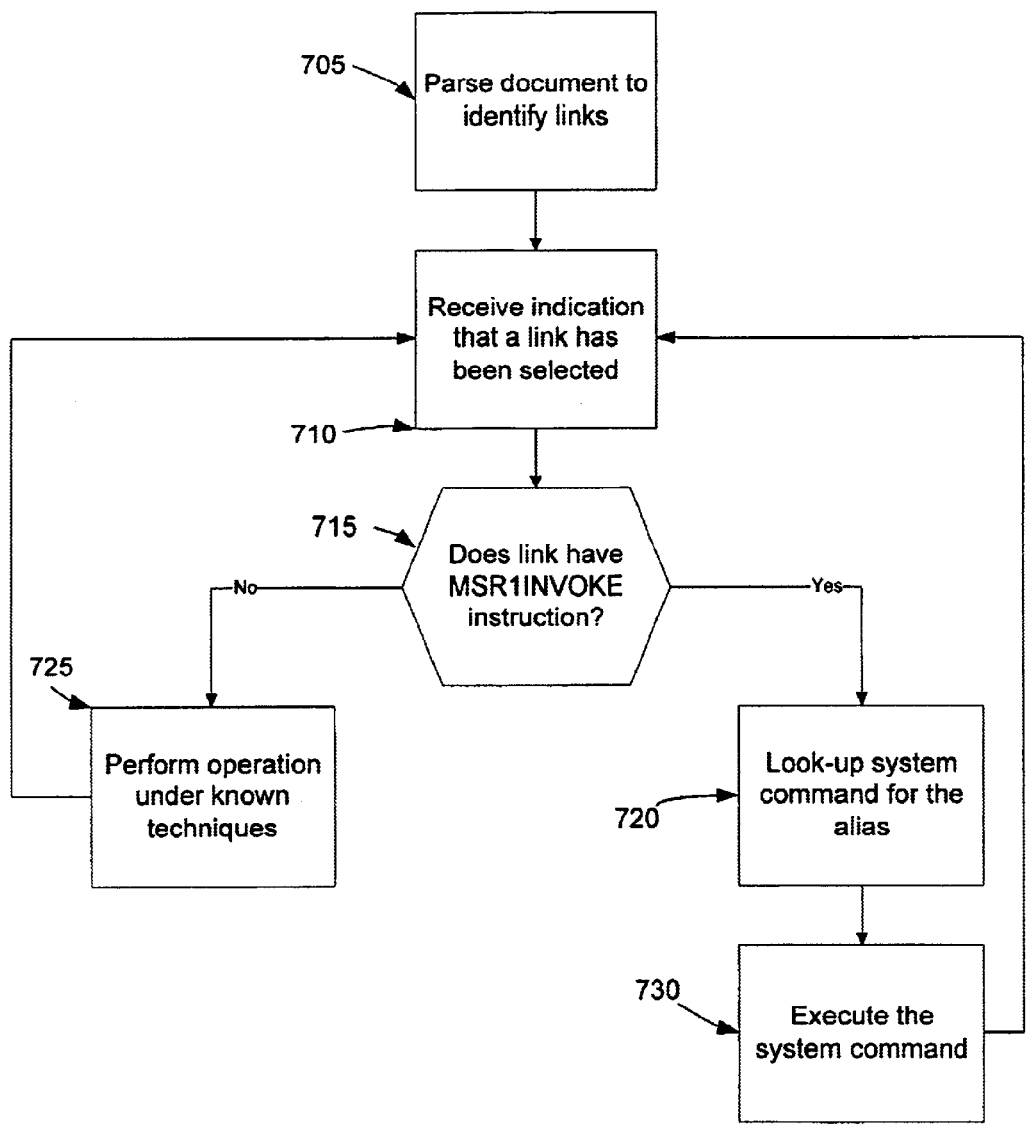
FIG. 7 is a flow chart depicting the process by which a system command may be invoked in accordance with a preferred embodiment of the present invention.

FIG. 7 is a flow chart depicting the process by which a system command may be invoked in accordance with a preferred embodiment of the present invention. Though the present invention covers any mark-up language document and a system that interacts with such mark-up language documents, the following example is presented in the specific application of a reading device. At step 705, a reading program parses the mark-up language document to recognize the links that are present in the document. At step 710, the program monitors whether the user has selected a link. Once the user selects a link, the program reads the link to determine the form of the link. One option is that the link may identify a standard protocol in which case the program follows operation in accordance with known techniques (step 725). For example, if the link refers to another mark-up language document, the software will navigate to and display that document. The other option is that the link indicates that a system resource is to be invoked, namely it recites the "Xs MSR1INVOKE" protocol. At step 720, the link is then checked to identify the alias for that link and table 300 is checked to identify the specific system command to be performed. At step 730, the program performs the pre-defined system command. The system then returns to step 710 where it waits for the user to select another link.

Advantageously, the present invention overcomes many of the limitation of the prior art. For example, the present invention provides a technique to invoke system commands automatically from within a mark-up language document. As another example, since only pre-defined system commands may be invoked as provided in look-up table 300, undesirable or even harmful system commands are thereby precluded from being invoked. As yet another example, since the system commands are not embedded within the document itself, the size of the document is reduced. As even another example, table 300 may be subsequently modified to alter existing system commands and even to include additional system commands.

It will be apparent to those skilled in the art that application of the present invention need not merely be utilized in conjunction with a reading device. The present invention may be implemented within any computing environment and may be used with any application using mark-up language documents including, for example and without limitation, a web browser or a word processor.

In the foregoing specification, the present invention has been described with reference to specific exemplary embodiments thereof. Although the invention has been described in terms of a preferred embodiment, those skilled in the art will recognize that various modifications, embodiments or variations of the invention can be practiced within the spirit and scope of the invention as set forth in the appended claims. The specification and drawings are, therefore, to be regarded in an illustrated rather than restrictive sense. Accordingly, it is not intended that the invention be limited except as may be necessary in view of the appended claims.

What is claimed is:

1. A computer-readable medium having stored thereon a mark-up language file associated with a computing system running an operating system and having predefined system commands, the mark-up language file comprising in combination:

(a) a link embedded within the mark-up language file that can be selected by a user viewing the mark-up language file;

(b) an alias within the link that identifies a predefined system command and enables said computing system to execute the predefined system command when the user has selected the link; and (c) an instruction within the link to invoke the predefined system command;

wherein the instruction is X-MSR1INVOKE.

2. The computer-readable medium of claim 1 wherein the alias is an integer.

3. The computer-readable medium of claim 1 further having stored thereon a table comprising a plurality of aliases and a corresponding predefined system command for each of the aliases.

4. The computer-readable medium of claim 1 wherein the mark-up language file is an e-book.

5. The computer-readable medium of claim 1 wherein the predefined system command is selected from the group consisting of system configuration commands, networked operations, commerce functions, and utilities commands.

6. The computer-readable medium of claim 1 wherein the predefined system command is selected from the group consisting of Brightness, Contrast, Page Color, Rotate, Visual Guides, All Annotations, Bookmarks, Highlights, Notes, Drawings, and Riffle Increments.

7. The computer-readable medium of claim 1 wherein the predefined system command is selected from the group consisting of Network Lookup and Network Search.

8. The computer-readable medium of claim 1 wherein the predefined system command is selected from the group consisting of Initiate Transaction, Initiate File Upload, and Form Post.

9. The computer-readable medium of claim 1 wherein the predefined system command is Load Value.

10. The computer-readable medium of claim 1 wherein the predefined system command corresponds to an applet for a third-party application.

11. The computer-readable medium of claim 1 wherein the mark-up language document is selected from the group consisting of HyperText Markup Language (HTML) document, Standard Generalized Markup Language (SGML) document, eXtensible Markup Language (XML) document, eXtensible HyperText Markup Language (XHTML) document, and Synchronized Multimedia Integration Language (SMIL) document.

12. An application program having computer-executable instructions for reading a mark-up language file associated with a computer running an operating system and having predefined system commands, the mark-up language file comprising in combination:

(a) a link embedded within the mark-up language file that can he selected by a user viewing the mark-up language file;

(b) an instruction within the link to invoke a predefined system command; and (c) an alias within the link that identified the predefined system command and that enables a computing system to execute the predefined system command when the user has selected the link;

wherein the instruction is X-MSR1INVOKE.

13. The application program of claim 12 having further computer-executable instructions for reading a table, the table having a plurality of aliases and a corresponding predefined system command for each of the aliases.

14. The application program of claim 12 wherein the mark-up language file is an e-book.

* * * * *